Patented May 1, 1945

2,374,647

UNITED STATES PATENT OFFICE 2,374,647

CONDENSATION PRODUCTS OF HETERO-MONOCYCLIC UREA DERIVATIVES

William James Burke, Marshallton, and Fred Wayne Hoover, Wilmington, Del., assignors to E. I. du Pont de Nemours & Company, Wilmington, Del., a corporation of Delaware No Drawing. Application August 31, 1942, Serial No. 456,790

10 Claims. (Cl. 260—2)

This invention relates to new condensation products and processes for their production and use. More particularly, it refers to a class of linear condensation polymers having many desirable properties.

Recent developments in the field of synthetic plastics have shown that the qualities of toughness, pliability, thermoplasticity and solubility are best attained in polymers of linear molecular structure. As examples of such materials mention may be made of the polyamides, polyesters and polyethers. Polymers of this type possess the foregoing desirable characteristics to a marked degree.

The urea-formaldehyde resins which have found extensive use as heat hardening plastics are of an entirely different type. These products have a highly cross-linked molecular structure and as a result are hard, rigid, and so brittle that they cannot be used without fillers. Several methods for modifying urea-formaldehyde resins in order to overcome these disadvantages have been developed. One method of modification, in order to reduce the degree of cross-linking, with its concurrent disadvantages, has been to condense the reactants in the presence of alcohols. The resulting compositions are used as baking finishes and, although the resin is still heat hardening, approximately one molecule of alcohol is retained for each molecule of urea, so the extent of cross-linking is without doubt reduced. The modified resins, while transparent and colorless, are brittle and low in impact strength.

Urea-formaldehyde resins have also been modified with glycols and other poly-hydroxylated organic compounds. While the resulting products are improvements over the unmodified resins, they are still cross-linked to an undesirable degree. Polymers of this type have been prepared by condensing a glycol or other polyhydroxylated organic compound with dimethylolurea or its dimethyl ether. However, even when a molecule of glycol is used for each molecule of urea derivative, the resulting modified resins are still cross-linked to an undesirable degree.

While these modified urea-formaldehyde resins are superior to the unmodified resins for certain purposes, they are all thermosetting and in the cured state contain such a high degree of cross-linkages that they are insoluble and infusible. These characteristics are in many cases so undesirable that they prevent the use of the modified resins for numerous purposes.

It is an object of the present invention to produce new resins which are not subject to the aforesaid disadvantages and other disadvantages which directly or indirectly result therefrom. A further object is to produce resins which are tough, pliable, thermoplastic and soluble. A still further object is to produce a new class of resins which may be used alone, in admixture with one another and/or in admixture with prior art polymeric materials in the form of fibers, films, molded articles, adhesives, and finishes. Additional objects will become apparent from a consideration of the following description and claims.

These objects are attained in accordance with the present invention which comprises reacting a poly-hydroxylated organic compound, the corresponding thiols, or organic compounds having substituted thereon both hydroxyl and thiol groups with a heteromonocyclic urea derivative wherein the nitrogen atoms thereof are free from directly-attached hydrogen atoms. In a more restricted sense this invention pertains to a class of new condensation products produced by reacting a glycol or a dithiol with a heteromonocyclic urea derivative wherein all the valences of the nitrogen atoms are connected with carbon atoms. In a still more restricted sense this invention is concerned with condensation products resulting from the reaction of a glycol or a dithiol with a heteromonocyclic compound having an N,N'-dialkoxymethyl ureylene (or dialkoxymethyl thioureylene) group as part of the ring structure. In a still more restricted sense the reaction just referred to is carried out while maintaining the temperature of the reaction mass within the range of 50° C. to about 250° C. In a still more restricted sense the foregoing reactions, particularly where glycols are employed, are carried out in the presence of suitable catalysts, while maintaining the pH of the reaction mixture within the range of about 3.5 to about 4.5. In one of its preferred embodiments this invention pertains to linear condensation products obtained by reacting ethylene glycol with N,N'-bis-(methoxymethyl) uron in the presence of a catalyst while maintaining the temperature within the range of 50° C. to 150° C. and the pH within the range of 3.5 to 4.5. Another preferred embodiment of this invention is concerned with a linear condensation product resulting from the reaction of ethanedithiol with N,N'-bis-(methoxymethyl) uron while maintaining the temperature within the range of 50° C. to 200° C.

The invention may be more readily understood by a consideration of the following illustrative examples wherein the amount of reactants is given in parts by weight.

*Example I*

A mixture of 190.13 parts of bis-(methoxymethyl) uron and 94.18 parts of ethanedithiol is heated in a closed container for 64 hours at 100° C. The reactor is opened and heated at 100° C. and atmospheric pressure for 3 hours while the methanol distills out. The temperature is raised to 179° C. and the pressure reduced from atmospheric to 2 mm. during 15 minutes, and the mixture is then heated for 3 hours at 179° C./2 mm. The polymer prepared in this way has a melt viscosity of 654 poises at 131° C. Films pressed from this polymer have a tensile strength of 960 lbs./sq. in. and an elongation of 200% at 25° C. and 50% relative humidity. The polymer melts at 70° C. and the molten polymer is easily spun into fibers at 100° C. It is readily soluble in chloroform, cyclohexanone and ethylene dichloride but insoluble in water, toluene, petroleum hydrocarbons, ethyl alcohol, butyl alcohol, acetone, dioxane and methoxyethanol. In the absence of acidic catalysts it shows no heat hardening properties and films remain soluble and fusible even after baking 72 hours at 100° C. The polymer is clear, colorless and odorless and possesses excellent resistance to water. It is compatible with linear polyamides.

The bis-(methoxymethyl) uron used in the preparation of this polymer is prepared by the method of Kadowaki (Bull. Chem. Soc. (Japan) 11, 248–261 (1936)). A mixture of 220 parts of formaldehyde (37% aqueous), 36 parts of urea, and 3.6 parts of barium hydroxide is heated at 90° C. for 20 minutes. The solution is concentrated and the resulting viscous residue dissolved in 500 parts of methanol containing 3.8 parts of concentrated hydrochloric acid. After the mixture has stood for one hour, the hydrochloric acid is neutralized, the reaction mixture made weakly alkaline to phenolphthalein and the methanol removed by distillation. The residue is filtered to remove suspended solids and then distilled under reduced pressure. The product is a water white liquid which distills at 111–113° C./2 mm. It is further purified by recrystallization from equal volumes of a mixture of chloroform and petroleum ether and then redistillation at 111–113° C./2 mm. The purified product has a melting point of 28–28.5° C.

*Example II*

A mixture of 62.05 parts ethylene glycol, 190.13 parts of bis-(methoxymethyl) uron, and 2.32 parts diethylmethyl-sulfonium iodide is heated at 100° C. for 72 hours while a stream of purified nitrogen is bubbled through the reaction mixture to remove the methanol as rapidly as it is formed. The product is a sticky glassy polymer which is soluble in water and chloroform but insoluble in toluene and petroleum hydrocarbons. The polymer is compatible with polyvinyl alcohol, regenerated cellulose, cellulose acetate and chlorinated rubber.

*Example III*

A mixture of 203.14 parts of tetrahydro-1,3-bis-(methoxymethyl) - 5 - methyl - 2(1) - s-triazone, 94.18 parts of ethanedithiol, and 0.38 part of p-toluene sulfonic acid is heated in an atmosphere of nitrogen for 75 minutes at 100° C. During this time the reaction mixture boils and then stops boiling when the rate of evolution of methanol slows down. A stream of nitrogen is then bubbled through the mixture while it is heated for 19.5 hours at 100° C. The product is a clear colorless polymer which is soluble in chloroform and dioxane but insoluble in water, petroleum hydrocarbons, and toluene and which melts at 75° C. The molten polymer can be spun into fibers at 100° C.

*Example IV*

A mixture of 190.13 parts of bis-(methoxymethyl) uron, 118.11 parts of hexamethylene glycol, and 2.32 parts of diethylmethylsulfonium iodide is heated at 100° C. for 6.5 hours while a stream of nitrogen is bubbled through the reaction mixture. An additional 2.32 parts of diethylmethylsulfonium iodide is added and heating is continued for 24 hours. A further 2.32 parts of diethylmethylsulfonium iodide is added and heating is continued for 7 hours longer. The product solidifies upon cooling to form a white waxy solid which melts at 68° C. It is soluble in chloroform and dioxane but insoluble in water and petroleum hydrocarbons.

*Example V*

A mixture of 190.13 parts of bis-(methoxymethyl) uron and 154.30 parts of di-(beta-mercaptoethyl) sulfide are heated in a closed reactor for 16 hours at 140° C., followed by 2 hours at 131° C. and atmospheric pressure, 4.5 hours at 131° C. and atmospheric pressure, 7.5 hours at 131° C./3 mm., and 12 hours at 179° C./3 mm. The product is a soft, thermoplastic polymer which is tacky at room temperature and has a melt viscosity of 21.8 poises at 131° C.

*Example VI*

A mixture of 190.13 parts of bis-(methoxymethyl) uron, 174.13 parts of 4.5 dihydro-1,3-bis(methoxymethyl)2 (3) imidazolone and 188.36 parts of ethanedithiol are heated in an atmosphere of nitrogen in a closed reactor for 88 hours at 140–150° C. The vessel is then opened and 320 parts of dry benzene is added to the reaction mixture which is then heated for one hour at 131° C. and atmospheric pressure while the benzene and methanol are removed by distillation through a column. The product is then heated 12 hours at 179° C./3 mm. The polymer is a light colored clear glassy solid which crystallizes on long heating at 130° C. but is tougher and stronger in the amorphous state. The melt viscosity of the supercooled polymer is 409 poises at 131° C.

*Example VII*

A mixture of 47.66 parts of N,N'-bis(methoxymethyl) uron and 15.56 parts of ethylene glycol, to which a small crystal of p-toluene sulfonic acid is added, is heated at 90° C. for 2.1 hours, then at 110° C. for 2 hours and finally at 155° C. for 4 hours. Throughout the reaction, a stream of purified nitrogen is passed through the mixture to remove the methanol formed. Samples of the condensation product, taken out at intervals, are found to be soluble in methanol and ethanol, except near the end of the heating period when the product (a viscous liquid) becomes insoluble in these solvents.

It is to be understood that the foregoing examples are illustrative merely of a few of the many modifications to which this invention may be subjected. They may be varied widely with respect to the individual reactants, the amounts thereof and the conditions of reaction without departing from the scope of the invention.

The general procedure for preparing the products of this invention is to heat approximately equal molecular quantities of the reactants with or without a catalyst under conditions such that the alcohol formed can be removed from the reaction mixture. For particular purposes it is contemplated that a plurality of selected heteromonocyclic urea derivatives and/or a plurality of selected hydroxy and/or thiol-substituted organic compounds may be employed. By a suitable selection of such mixtures, in accordance with the instructions hereinbefore and hereinafter given, products having particularly desirable properties for certain purposes may be prepared.

Heteromonocyclic urea derivatives contemplated for use herein may be represented by the following general formula:

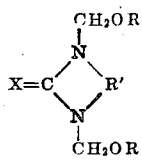

wherein X represents a chalcogen of atomic weight less than 33, i. e., oxygen or sulfur; the R's, which may be identical or different, represent the non-hydroxy portion of a monohydric alcohol boiling below 210° C. at 760 mm.; and R' represents a divalent acyclic organic radical of chain length 2 or 3, both terminal atoms of which are carbon, any other chain member present being carbon, oxygen, sulfur or tertiary nitrogen, and wherein all hydrogen atoms are attached only to carbon. In this formula it should be noted that the nitrogen atoms of the heteromonocyclic ring are free from directly-attached hydrogen atoms. Each valence of these nitrogen atoms should preferably be attached to a carbon atom. The absence of reactive hydrogen atoms from the nitrogen atoms of this structure practically eliminates the possibility of undesirable cross-linkages occurring in the condensation reaction to which these compounds are subjected.

Many of the heteromonocyclic urea derivatives contemplated for use herein may be represented by the following structural formula, which is somewhat more restricted than that previously referred to:

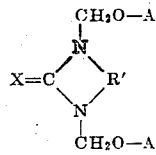

wherein X represents an oxygen or sulfur atom, and R' represents a divalent organic radical completing a 5- or 6-member heterocyclic ring. Among the divalent radicals which are represented in the above formula by R' may be mentioned CR''₂OCR''₂, CR''₂SCR''₂,

CR''₂NR''CR''₂,

CR''₂CR''₂, CR''₂CR''₂CR''₂, CR''₂CO, COCO, COCR''₂CO, COCOCO, and COCR''₂CR''₂ where R'' is a hydrogen atom or an alkyl group. As examples of such compounds may be mentioned N,N'-bis-(methoxymethyl) uron; 4,5 dihydro-1,3 bis-(methoxymethyl) 2(3)imidazolone; tetrahydro - 1,3 - bis - (methoxymethyl) - 5 - methyl - 2 - (1) - s - triazone; 1,3 - bis - (methoxymethyl) - 5,5 - dimethyl hydantoin; 3,5 - bis - (methoxymethyl)tetrahydro - 1,3,5 - thiadiazine - 4 - one; N,N'-bis-(methoxymethyl)parabanic acid; N,N'-bis-(propoxymethyl)-barbituric acid; N,N'-bis-(amyloxymethyl)hydantoin; N,N' - bis - (ethoxymethyl)hydrouracil; N,N' - bis - (methoxymethyl)isobarbituric acid; N,N' - bis - (methoxymethyl) alloxan; N,N' - bis - (benzyloxymethyl) - uron; N,N'-bis-(furyloxymethyl)uron; etc. The letter "A" in the above formula represents the non-hydroxy portion of monohydric alcohols such as methyl, ethyl, propyl, isopropyl, butyl, isobutyl, amyl, hexyl, octyl, benzyl, furfuryl, tetrahydrofurfuryl, methoxyethyl, ethoxyethyl alcohols and, in general, any monohydric alcohol boiling below 210° C. at 760 mm. These compounds are all similar in that they have a dialkoxymethyl ureylene (or thioureylene) group as part of a heterocyclic ring and as a consequence all valence bonds of the nitrogen atoms are attached to carbon atoms. Because of the structure they behave as strictly difunctional compounds in their reactions with glycols and dithiols.

Among the heterocyclic compounds which are preferred for use herein is tetrahydro-3,5-bis-(methoxymethyl)-1,3,5-oxadiazin-4-one

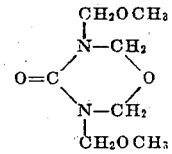

hereinbefore and hereinafter referred to as bis-(methoxymethyl) uron. This compound is prepared from urea, formaldehyde, and methanol by essentially the method described by Kadowaki in the Bull. Chem. Soc. (Japan) 11, 248–261 (1936). This monomer permits the preparation of polymers based entirely on urea, formaldehyde, and the glycol or dithiol selected for use in the condensation.

Another class of preferred heterocyclic compounds is tetrahydro-1,3-bis-(alkoxymethyl)-5-alkyl-2(1)-s-triazones

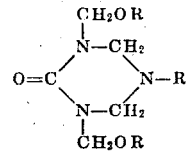

wherein R represents an alkyl group which may be further substituted. These compounds may be prepared from urea, formaldehyde, an alcohol and a primary amine by the method described in an application filed by W. J. Burke, on January 15, 1942, entitled "Ring compounds," Serial No. 426,905. They are particularly useful herein since they provide a method for preparing basic polymers, and because incorporation of this monomer either as a major or minor component stabilizes the polymer against degradation by acids.

Still another class of preferred heterocyclic compounds is the 4,5-dihydro-1,3-bis(alkoxymethyl)-2(3)-imidazolones

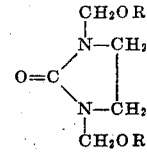

These compounds are useful because of the excellent stability of the ring system and because the polymers formed from them generally have higher melting points.

The aforementioned heteromonocyclic urea derivatives are condensed with poly-hydroxylated organic compounds, the corresponding thiols, or organic compounds having substituted thereon both hydroxyl and thiol groups. In general, these compounds are glycols, dithiols, and hydroxythiols corresponding to the following general formula H—X—R'—X—H, wherein X represents sulfur or oxygen, and one X may be sulfur and the other oxygen; R' represents a divalent radical containing at least two aliphatic carbon atoms; and each X—H group is attached to a different aliphatic carbon atom. The foregoing compounds should advisably contain no other reactive groups. It is to be understood that aromatic residues may form part of the molecule provided the hydroxyl or mercaptan groups are attached to aliphatic carbon atoms. Hetero-atoms such as oxygen, sulfur, and NR may also form part of the divalent radical represented above by R'. Examples of a few of these compounds are the polyethylene glycols

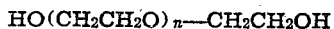
HO(CH$_2$CH$_2$O)$_n$—CH$_2$CH$_2$OH their sulfur analogs, HS(CH$_2$CH$_2$S)$_n$—CH$_2$CH$_2$SH, wherein $n$ represents an integer no higher than 4. Another example of such compounds is N,N'-diethanol ethylamine.

Among the glycols and dithiols which are preferred for general use herein are ethylene glycol, hexamethylene glycol, decamethylene glycol, ethane dithiol, trimethylene dithiol, decamethylene dithiol, di-(betamercaptoethyl) sulfide, and the like.

As a general rule, the reactivity of the hydroxyl and thiol groups in the organic compounds just referred to is greatest if they are primary. Secondary hydroxyl and thiol groups are ordinarily less reactive and tertiary groups are least reactive. Consequently, primary hydroxyl and/or thiol groups are generally preferred for this purpose. Next in order of preference are compounds containing secondary hydroxyl and/or thiol groups; and last are those compounds which contain tertiary hydroxyl and/or thiol groups.

It is also to be understood that other hydroxyl- and/or thiol-substituted organic compounds than those specifically referred to herein may be employed. A representative few of these additional compounds are glycerin, erythritol, pentaerythritol, sorbitol, 1-thiosorbitol, glucose, etc. When these latter compounds are used the resulting condensation products, while useful for many purposes, may not be strictly linear in character. Nevertheless, these compounds sometimes serve the useful purpose of insolubilizing the resulting products when added in small amounts to a reaction mass containing a heteromonocyclic derivative and a lower molecular weight hydroxyl- and/or thiol-substituted organic compound.

In preparing the high molecular weight products embraced herein the purity of the individual reactants is frequently of great importance since a slight amount of impurity may stabilize the polymers at a lower molecular weight than is desired. The same undesirable result may occur if an excess of one of the reactants is present. Of course, it is understood that the invention is not limited to high molecular weight products; and where a product of lower molecular weight is desired the same care need not be observed in selecting reactants of high purity or determining the proportions thereof to be employed. For example, where the products are to be used as plasticizers they may be of lower molecular weight, so monomers of ordinary purity may be used in their preparation, or an appreciable excess of one reactant may be used in the reaction.

Whether or not a catalyst is used, the particular type of catalyst selected and the amount thereof to be employed, will depend to a considerable extent upon the particular reaction under consideration and the purposes for which the product is used. Glycols react sluggishly in the absence of a catalyst, as a general rule. Furthermore, the equilibrium point of such a reaction does not ordinarily favor the production of high molecular weight products. Consequently, where glycols are used and high molecular weight products are desired the condensation should generally be conducted in the presence of a small amount of an acid or acidic salt as catalyst, and under such conditions that the alcohol formed will be removed from the reaction as rapidly as possible. This may conveniently be accomplished, as in Example II, by carrying out the reaction in the presence of a catalyst at a temperature above the boiling point of methanol, while nitrogen is bubbled through the reaction mass to carry off the methanol as rapidly as it is formed.

In contrast with the glycols, the dithiols react rapidly as a general rule, even in the absence of a catalyst. Likewise, the equilibrium point of the reaction is ordinarily much more favorable to the formation of high molecular weight polymers. Since many of the dithiols are quite volatile, the ingredients of the reaction in which they are used are customarily first heated in a closed reactor, as in Example I, until equilibrium has been established and practically all of the dithiol has reacted at least on one thiol group so it can no longer be lost by volatilization. The reactor may then be opened, the alcohol removed by distillation, and the polymerization continued at higher temperature and under reduced pressure in order to remove the alcohol more effectively.

In deciding whether to use a catalyst the stability and basicity of the reactants should also be considered. Basic ingredients require more strongly acidic catalysts while neutral ingredients may be reacted in the presence of a less acidic catalyst, or in the complete absence of any catalyst. For instance, a neutral monomer such as bis-(methoxymethyl) uron, which would sometimes undergo troublesome cross-linking reactions at high temperatures in the presence of strong acid catalysts, can be condensed with glycols in the presence of trialkylsulfonium iodides or with dithiols without any added catalyst. Catalysts contemplated for use in many of these reactions are strong acids or materials easily convertible to strong acids, salts of strong acids and weak bases, and trialkylsulfonium iodides. The preferred catalysts include, in their order of decreasing strength, sulfuric acid, hydrochloric acid, phosphoric acid, p-toluenesulfonic acid, dimethyl sulfate, diethyl methyl sulfonium methyl sulfate, methyl phenyl octadecyl sulfonium methyl sulfate, iodine, ammonium, chloride, zinc chloride, magnesium bromide, diethyl methyl sulfonium iodide, and dodecyl dimethyl sulfonium iodide. These are catalysts known and used in the art to facilitate acetal formation and interchange.

The amount of catalysts used may vary widely, although for satisfactory results it will generally lie within the range of about 0.001 to about 0.1 molecule per molecule of heteromonocyclic urea derivative. The preferred amount of catalyst for a large number of widely different condensation reactions has been found to be within the range of about 0.005 to 0.02 molecule per molecule of heteromonocyclic urea derivative employed.

It is understood, of course, that the amount of catalyst will depend to a great extent upon the particular catalyst selected. Smaller amounts of an active catalyst will produce approximately the same results as large amounts of a less active catalyst. For example, chloroform is an extremely mild catalyst so it may ordinarily be used in much higher concentrations than some of the stronger catalysts. Chloroform also possesses the advantage of serving the dual function of catalyst and solvent for the reaction. The ease with which it may be removed from the final product is likewise an advantage.

The hydrogen ion concentration of the reaction mixture containing the catalyst may vary widely. In general, it should be between 2 and 6, as determined with a glass electrode after dilution with an equal weight of water. For optimum results over a wide range of reactions, a pH between 3.5 and 4.5 is preferred, especially with compounds such as N,N'-bis-(methoxymethyl) uron which may undergo troublesome side reactions at lower pH's. It should be understood that the pH of the reaction mixture is only one factor in the action of the catalyst and that other factors also influence this action.

The temperature at which the polymerization reaction is carried out varies with the stability of the reactants and the products. Since the rate of condensation increases with increasing temperature, it is usually advantageous to use as high a temperature as is possible without decomposition or other unfavorable side reactions. In general, the temperature may be between about 50° and about 250° C. The optimum temperature for numerous reactions will ordinarily lie between about 80° C. and about 200° C. Other factors besides the rate of condensation will have a bearing upon the temperature selected for any given reaction. For example, in order to prevent loss of volatile reactants, the initial stages of the reaction may be carried out at a relatively low temperature and the later stages at a higher temperature. The temperature will also depend to a certain extent upon the catalyst used, since the polymer prepared with one catalyst may decompose at a different temperature than a polymer prepared with another catalyst or without any catalyst.

Since polymerization takes place by a reversible reaction, it is usually advisable that the alcohol formed be removed as completely as possible from the reaction mixture if a high molecular weight resin is to be obtained. This may conveniently be accomplished by heating the polymerization mixture under reduced pressure, especially during the latter stages of the reaction. The same effect may also be obtained by passing an inert gas through the hot reactants in order to carry off the alcohol as it is formed. This latter method may be employed at atmospheric, subatmospheric, or superatmospheric pressures. Another method is to use an inert liquid such as toluene as the solvent and to reflux it in a column wherein the alcohol is removed from the top by distillation. Since some of the reactants are rather volatile it is often desirable to carry out the first stages of the polymerization in a closed reactor under the pressure developed by the alcohol evolved. This latter procedure is particularly useful in polymerizations involving the more volatile dithiols, since greater precautions are necessary to maintain the balance of ingredients and since the dithiols react sufficiently, even in the presence of the alcohol evolved, to prevent their loss during the removal of alcohol in subsequent stages of the polymerization.

Products having surface tension modifying properties and useful as emulsifying agents may be obtained by carrying out the previously described condensation reaction in the presence of a monofunctional organic compound having at least six carbon atoms and a labile hydrogen atom. Examples of such compounds which may be used as a third component in the foregoing reaction are long chain monohydric alcohols such as dodecanol-1; amides such as lauramide; amines such as dodecylamine; thiols such as dodecane-1-thiol; acids such as lauric acid; monoglycerides such as monostearin; alkyl phenols, ureides, N-mono-substituted anilines, sulfonamides, thioethers such as 1-dodecyl-thiosorbitol, methylolamides, esters of hydroxyacetic acid, etc. For the best results in these three component condensations, it is desirable that the molar ratio of the ureylene to the glycol or thiol be between 1:1 and 2:1, and that there be between 2.5 and 50 moles of the modifying third component for each 100 moles of ureylene. Products so obtained have colloidal properties and may therefore be used advantageously in processes involving wetting, penetrating, deterging, dispersing, emulsifying, frothing, foaming and kindred phenomena.

By means of the present invention a new class of condensation products having many desirable characteristics may be produced. These products are free from numerous disadvantages of the prior art urea-formaldehyde resins and their modified derivatives. They may be used as resinous plasticizers and modifying agents for other resins such as polyvinyl alcohol, regenerated cellulose, cellulose acetate, chlorinated rubber, polyvinyl chloride, protein and linear polyamides. These products also have the advantage of being clear, colorless, odorless and non-volatile. They are of particular advantage for applications where volatile plasticizers cannot be used.

In addition to the foregoing advantages, these products are also useful as finishing agents for textiles, leather, and fibrous materials generally. They are suitable for use as adhesives for wood, paper, glass, regenerated cellulose, cellulose acetate, polyvinyl acetates, leather and linear polyamides. Furthermore, they may be used to impregnate fibrous materials such as wood, or paper as in the grease proofing of paper. Some of the water soluble products are also effective as surface-active agents either alone or in admixture with prior art surface-active agents.

As many apparently widely different embodiments of this invention may be made without departing from the spirit and scope thereof, it is to be understood that the invention is not limited to the specific embodiments thereof except as defined in the appended claims.

We claim:

1. A process for preparing linear condensation products which comprises condensing by heating approximately equal molecular quantities of a member selected from the class consisting of glycols and dithiols wherein each hydroxyl and thiol group is attached to a different aliphatic carbon atom, having but two reactive groups, with a heteromonocyclic urea derivative having the following general formula:

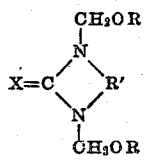

wherein X represents a chalcogen of atomic weight less than 33, the R's may be dissimilar, are non-reactive, and represent the non-hydroxy portion of a monohydric alcohol boiling below 210° C. at 760 mm., and R' represents a non-reactive divalent organic radical of chain length 2 to 3, both terminal atoms of which are carbon, any other chain member present being a member selected from the group consisting of carbon, oxygen, sulfur and tertiary nitrogen, and wherein all hydrogen atoms are attached only to carbon.

2. The process of claim 1 wherein the condensation reaction is carried out at a temperature within the range of about 50° C. to about 250° C.

3. The process of claim 1 wherein the condensation reaction is carried out at a temperature within the range of about 50° C. to about 250° C., and the pH of the reaction mixture is within the range of about 3.5 to about 4.5.

4. A process for preparing linear condensation products which comprises condensing approximately equal molecular quantities of a member selected from the class consisting of glycols and dithiols wherein each hydroxyl and thiol group is attached to a different aliphatic carbon atom, having but two reactive groups, with an N,N'-bis(alkoxymethyl)uron, at a temperature within the range of about 50° C. to about 250° C.

5. A process for preparing linear condensation products which comprises condensing approximately equal molecular quantities of ethylene glycol with N,N'-bis(methoxymethyl)uron, at a temperature within the range of about 50° C. to about 250° C.

6. Linear condensation products produced in accordance with the process of claim 1.

7. Linear condensation products produced in accordance with the process of claim 4.

8. Linear condensation products produced in accordance with the process of claim 5.

9. A process for preparing linear condensation products which comprises condensing approximately equal molecular quantities of ethanedithiol with N,N'-bis(methoxymethyl)uron at a temperature within the range of about 50° C. to about 250° C.

10. Linear condensation products produced in accordance with the process of claim 9.

WILLIAM JAMES BURKE.
FRED WAYNE HOOVER.